Feb. 17, 1925.
C. F. ERICKSON
WHEEL
Filed May 21, 1923
1,527,037
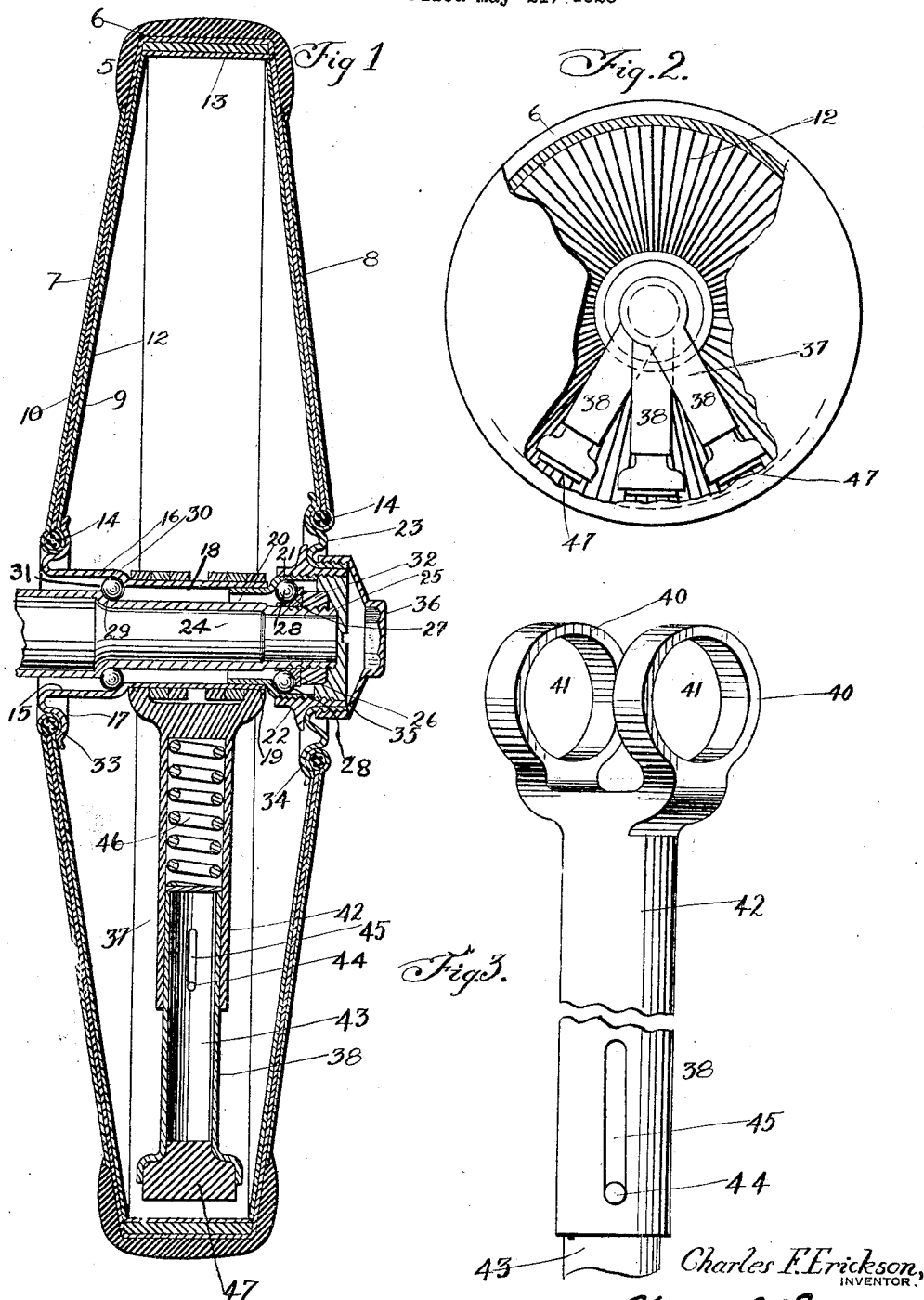
Charles F. Erickson, INVENTOR.
BY Victor J. Evans, ATTORNEY.
WITNESS: J B White Patented Feb. 17, 1925.

1,527,037

UNITED STATES PATENT OFFICE.

CHARLES F. ERICKSON, OF BROOKLYN, NEW YORK.

WHEEL.

Application filed May 21, 1923. Serial No. 640,598.

*To all whom it may concern:*

Be it known that I, CHARLES F. ERICKSON, a subject of the King of Sweden, residing at Brooklyn, in the county of Kings and State of New York, have invented new and useful Improvements in Wheels, of which the following is a specification.

This invention relates to wheels generally and particularly to wheels of the cushioning or elastic type designed for use in connection with automobiles, flying machines, and other vehicles.

An object of the invention is to provide a wheel of this character which is preferably non-pneumatic and which is characterized by means which gives the wheel all the advantages of a pneumatic wheel without the attendant disadvantages thereof.

A further object of the invention is to provide a wheel structure wherein the load carried thereby is supported in a hung or underslung condition from the hub of the wheel and wherein means of an elastic nature are associated with the tread and incorporated with means for automatically limiting flexure of the wheel and arresting loads and stress as same are transmitted to the wheel.

A still further object of the invention is to provide a wheel having an elastic tread and elastic supporting means therefor, and means for tensioning and varying the resilient action of the wheel, all of which of said parts are incorporated with means for limiting flexure of the supporting means beyond a fixed extent.

Another object of the invention is to provide a wheel of this character which will be extremely simple of construction and positive of action under all normal conditions and which will support varying loads in a highly buoyant manner.

With these and other objects in view, the invention resides in certain novel construction and combination and arrangement of parts, the essential features of which are hereinafter fully described, are particularly pointed out in the appended claims and are illustrated in the accompanying drawing, in which:—

Figure 1 is a vertical section through the wheel.

Figure 2 is a side view with parts broken away and shown in section.

Figure 3 is a perspective view of one of the buffers.

In carrying the invention into practice, I employ a tire 5 comprising an elastic tread 6 and relatively separable side diaphragms 7 and 8. Each of these diaphragms consists of an inner ply of fabric 9, an outer ply of rubber 10, and an intermediate cord structure 12. The cord structure is interposed between the fabric plies of materials 9 and 10 and the cord strands radiate from the central portions of the diaphragms and are embedded in the tread 6 and associated with a steel spring ring 13 which is disposed in concentric relation to said tread. Each of the diaphragms is provided with a wire reinforcing ring 14.

The hub 15 of the wheel comprises a sleeve 16 having an annular disk 17 and a reduced cylindrical portion 18. The reduced portion 18 is welded or otherwise suitably secured at 19 to an exteriorly threaded bushing 20 having a ball race 21. The bushing adjustably receives a corresponding threaded tensioning member 22 which supports a disk 23.

The axle 24 passes through the hub 15 and same is provided with a reduced threaded portion 25 having a bearing 26 provided with a raceway 27, the latter co-acting with the raceway 21 and anti-friction balls 28. The axle is provided with a raceway 29 co-acting with a raceway 30 of the sleeve 16 to operatively accommodate an annular series of anti-friction balls 31. A nut 32 on the extension 25 coacts with the bearing 26 to hold the balls 28 and 31 operatively positioned in their respective raceways. The disk 17 is provided with an annular channel 33 which receives the wire ring 14 of the diaphragm 7. The disk 23 is provided with a similar channel 34 for the reception of the ring 14 of the mating diaphragm 8. From this construction it will be seen that when the tensioning member 22 is rotated upon the bushing 20 the diaphragms 7 and 8 may be moved relatively to regulate the tension upon the spring steel ring 13. The disk 23 is provided with a threaded flange 35 which accommodates a removable hub cap 36.

With the axle 24 and hub 15 associated with the diaphragms 7 and 8 as herein shown and described, it follows that the weight of the supported load is held suspended or in an underslung state from the steel spring ring 13 and that by adjusting the diaphragms the tension upon the ring may be varied according to the weight of the load to be supported. This construction also serves to permit the buoyancy of the wheel structure to be changed at will.

In view of the fact that the weight of the load is hung principally from the steel ring 13, it is an object of my invention to arrest what might be damaging shocks and stresses transmitted to this ring at the base of the wheel. I have provided a means or mechanism 37 for satisfactorily accomplishing this purpose. This mechanism is arranged preferably within the wheel between the diaphragms 7 and 8 thereof and same is hung from the hub 15 so as to float in the wheel in normal spaced relation to the tread. This mechanism comprises substantially identical buffers 38 which radiate in a downward direction from the hub. Each buffer is provided with branches 40—40 apertured at 41 to be pivotally accommodated by the hub and connected with these branches is a barrel 42 in which is mounted a sliding plunger 43. This plunger is provided with a stop pin 44 which co-acts with slots 45 in the barrel 42 and limits outward movement of the plunger against the action of a heavy coiled spring 46. This spring is operatively positioned in the barrel so as to bear against the inner end of the plunger and normally force the latter in an outward direction. While the pin 44 co-acts with the slots 45 to limit outward movement of the plunger and to hold same against casual derangement from the barrel 42, it further is positioned with respect to the tread 6 so as to hold an elastic foot 47 of the plunger in spaced relation to the inner wall of said tread. The plungers of the several buffers are disposed in concentric relation to the tread of the tire portion of the wheel at the base thereof or at a point approximately in line with the vertical center of the wheel and beneath the axis thereof. Incident to this arrangement it follows that any sudden or undue stresses that are applied to the tread of the wheel will be gradually absorbed and taken up by the buffers. This serves to limit flexure in one direction of the steel spring ring 13 and has been found to prevent serious damage to this ring and prevent accidental snapping or rupture thereof due to excessive strains applied thereto.

A wheel structure as herein shown and described is exceedingly light in weight and is strong and durable and consists principally of parts that are quickly accessible when repairs are desired to be made thereto.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A vehicle wheel provided with a laterally yieldable annular tread, and cushioning mechanism mounted in the wheel and freely suspended with relation to the hub and disposed in relation to the tread to engage same upon upward movement thereof, said mechanism including normally distended movable buffers arranged concentric with said tread.

2. A vehicle wheel provided with a springy tread, and means associated with the tread to be contacted thereby and serving to limit upward movement thereof, said means pivoted to the hub and normally mounted to float relatively of the tread in free relation thereto.

3. A yieldable tire for vehicles having means for automatically preventing its radial yielding movement beyond a fixed point, said means being freely suspended with relation to the hub.

4. A yieldable tire for vehicles having means for automatically preventing its radial yielding movement beyond a fixed point, said means being freely suspended with relation to the hub and adapted to be supported at a fixed position relatively of the hub of a wheel.

5. A yieldable tire for vehicles having means for automatically preventing its radial yielding movement beyond a fixed point, said means being freely suspended with relation to the hub and adapted to move radially of the hub of a wheel.

6. A wheel structure including a springy tread, a hub, separable adjustable diaphragms connecting the sides of the tread with the hub, means for moving the diaphragms relatively, and a shock absorber pivotally mounted to the hub and associated with the tread to limit flexure thereof.

7. A wheel structure comprising an elastic tread, annular spring means embraced by the tread, a hub, separable flexible adjustable diaphragms between the hub and tread, and yieldable means pivoted to the hub in normal free relation to the tread and adapted to be contacted thereby to limit flexure thereof in the application of stress thereto.

8. A wheel structure comprising adjustable diaphragms, a tread portion connecting the diaphragms together, a spring ring associated with the tread portion and arranged in concentric relation thereto, the diaphragms consisting of plies of fabric and rubber associated with cords extending through the tread portion and around the spring ring and a hub having means for adjusting the diaphragms with respect to each other.

9. A wheel structure comprising adjustable diaphragms, a tread portion connecting the diaphragms together, a spring ring associated with the tread portion and arranged in concentric relation thereto, the diaphragm consisting of plies of fabric and rubber associated with cords extending through the tread portion and around the spring ring, and a hub having means for adjusting the diaphragms with respect to each other and comprising a fixed bushing and a threaded sleeve operating thereon and connected with one of the diaphragms.

In testimony whereof I have affixed my signature.

CHAS. F. ERICKSON.